United States Patent Office 3,412,066
Patented Nov. 19, 1968

3,412,066
POLYCONDENSATION CATALYSTS FOR THE PREPARATION OF POLYESTERS AND POLYETHERESTERS
Robert Schnegg, Dormagen, Herbert Pelousek, Dormagen-Horrem, Robert Dippelhofer, Dormagen, and Herbert Nordt and Heinz-Adolf Dortmann, Leverkusen, Germany, assignors to Farbenfabriken Bayer Aktiengesellschaft, Leverkusen, Germany, a corporation of Germany
No Drawing. Filed Feb. 9, 1965, Ser. No. 431,471
5 Claims. (Cl. 260—47)

ABSTRACT OF THE DISCLOSURE

As a catalyst for the preparation of polyesters and polyetheresters by polycondensation, a member selected from the group consisting of (1) substantially equal parts of antimony triphenyl and germanium dioxide, and (2) substantially equal parts of antimony triphenyl and zinc acetyl acetonate.

---

This invention relates to polycondensation reactions, and more specifically, to a catalyst system which promotes polycondensation reactions.

In the preparation of polyesters and polyetheresters by a process which involves a re-esterifying and then polycondensing the reactants, it has long been known to influence the reaction by means of catalysts of various types. For example, catalysts generally used to promote the re-esterification reaction are compounds such as zinc acetate, calcium acetate, lithium hydride, lithium-m-borate, lithium acetate and the like. For the polycondensation reaction, antimony triphenyl, germanium dioxide, zinc acetyl acetonate, antimony trioxide, dibenzyl tin oxide, and the like compounds have generally been employed.

It is an object of this invention to provide a catalyst system for the polycondensation reaction which facilitates the reaction with the production of white or colorless polycondensates having a high viscosity.

It is a further object of this invention to define a unique catalyst system for the polycondensation reaction which exerts a synergistic effect on the reaction.

A still further object of this invention is to provide a unique catalyst system which significantly shortens the time required for polycondensation reactions as compared to those times required when conventional catalysts are used.

Yet another object of this invention is to provide a novel catalyst system which will yield a polycondensation product having significantly increased viscosities over those prepared using conventional catalysts.

The foregoing objects and others which will become apparent from the following description are accomplished in accordance with this invention generally speaking by providing a polycondensation process for the preparation of polyesters and polyether esters, wherein mixtures of substantially equal quantities of antimony triphenyl and germanium dioxide or antimony triphenyl and zinc acetyl acetonate in catalytic amounts are used as the catalyst.

Although it has been known to employ these catalysts individually in polycondensation reactions, it is completely unexpected that the combination of these catalysts as herein defined would exert synergistic effects on the polycondensation reaction resulting in substantially reduced reaction times and the production of white or colorless polycondensates of high viscosity. For example, where it is usually necessary to allow the polycondensation reaction to proceed for 1 hour at 280° C./1 mm. Hg in order to obtain polyesters which are capable of being spun into filaments having high strength values, where the catalyst system of this invention is employed, the reaction time required for polycondensation to a spinnable polyester or polyether ester material is shortened substantially.

With reference to the preparation of polyether esters and polyesters of a high viscosity, the synergistic effect of the catalyst system of this invention may be illustrated by an example in which the ethylene glycol ester of 1,2-bis(4-carboxyphenoxy)-ethane is polycondensed using the catalysts of this invention. With all other conditions remaining the same, similar polycondensations were carried out using the polycondensation catalyst generally employed heretofore and listed below. The following table illustrates a set of typical results:

| Catalyst | Catalyst Concentration, percent | $\eta$rel. (1% solution in m-cresol) |
|---|---|---|
| Germanium dioxide/antimony triphenyl, 1:1 | 0.1 | 2.39 |
| Zinc acetyl acetonate/antimony triphenyl, 1:1 | 0.1 | 2.06 |
| Antimony triphenyl | 0.1 | 1.46 |
| Germanium dioxide | 0.1 | 1.75 |
| Zinc acetyl acetonate | 0.1 | 1.73 |

It is readily apparent that the catalysts of this invention operate on the polycondensation reaction with synergistic effects which are amply demonstrated by a comparison with the results obtained when conventional catalysts are used.

Although any suitable amount of the catalyst system of this invention may be employed, it is generally desirable to use from about 0.01 to about 0.3% by weight based on the total weight of the solid substances present in the polycondensation reactions. Of course, more or less may be used within the definition of a catalytic amount of the catalyst as desired.

Where the polycondensation reaction is carried out following the re-esterification process, suitable catalysts for the re-esterification reaction should be employed. Some such suitable catalysts are, for example, lithium hydride, calcium acetate, lithium-m-borate, lithium acetate and the like.

The invention is further illustrated but is not intended to be limited by the following examples in which all parts and percentages are by weight unless otherwise specified.

Example 1

About 40 parts of dimethyl terephthalate and about 44 parts by volume of ethylene glycol are melted in a rotary evaporator with about 0.01 part of lithium hydride in a nitrogen atmosphere and heated for about 75 minutes at a temperature of about 150° C. and for about 75 minutes at a temperature of about 180° C., about 15 parts by volume of methanol being evolved. The excess glycol is removed by means of a water jet vacuum at about 130° C. and to the glycol terephthalate thus formed is added 0.1% of a 1:1 mixture of antimony triphenyl and germanium dioxide, the pressure being reduced within about 30 minutes to about 0.1 mm. Hg and the temperature being raised to about 270° C. to about 280° C. After a polycondensation period of about three hours, a white polymer is obtained which has a melting point of about 260° C. and a relative viscosity ($\eta$rel.) of about 1.84.

Example 2

About 47.5 parts of methyl p-(beta-hydroxyethoxy)-benzoate and about 19.5 parts of glycol ester of 1,2-bis-(4-carboxyphenoxy)-ethane are melted with about 0.04 part of lithium hydride in a rotary evaporator under a nitrogen atmosphere and precondensed for about 30 minutes at about 200° C., about 60 minutes at about 220° C. and about 60 minutes at about 250° C., about 8.5 parts by volume of methanol are evolved and condensed in a cooling trap.

The precondensate thus obtained has a melting point of about 160° C. to about 165° C. and a relative viscosity ($\eta$rel.) of about 1.16 (1% solution in m-cresol).

After adding about 0.1% by weight of a polycondensation catalyst mixture of germanium diovide and antimony triphenyl (1:1), polycondensation takes place for about five hours at about 270° C./0.2 mm. Hg, a practically colorless polycondensate being obtained which has a melting point of about 202° C. and a relative viscosity ($\eta$rel.) of about 1.62.

Under the same conditions, but using a mixture of antimony triphenyl and zinc acetyl acetonate (1:1) (0.1% by weight) as the polycondensation catalyst mixture, a polymer is obtained which has a melting point of about 205° C. and a viscosity ($\eta$rel.) of about 1.66.

Example 3

About 264 parts of methyl ester of 1,2-bis-(4-carboxyphenoxy)-ethane, about 200 parts of ethylene glycol and about 0.07 part of lithium hydride are melted in a rotary evaporator in a nitrogen atmosphere and heated for about 15 minutes at about 180° C. and for about 75 minutes at about 200° C. About 64 parts by volume of methanol are evolved. The excess glycol is extracted by means of a water jet vacuum and about 25 parts of the glycol ester thus obtained are heated with about 0.025 part of a catalyst mixture consisting of germanium dioxide and antimony triphenyl (ratio 1:1, i.e. about 0.0125 part of germanium dioxide and about 0.0125 part of antimony triphenyl), with gradual reduction of the pressure (about 0.1 mm. Hg) at about 280° C. The polycondensation period is about three to four hours and the product is a white polycondensate with a melting point of about 245° C. and a relative viscosity ($\eta$rel.) of about 2.39. Methanol extract=0.2%.

Under the same conditions, but with a mixture of about 0.1% by weight of antimony triphenyl and zinc acetyl acetonate (1:1) as the polycondensation catalyst, a polymer is obtained which has a melting point of about 245° C. and a viscosity ($\eta$rel.) of about 2.06.

It is to be understood that any materials which may be polycondensed and any suitable reaction conditions for accomplishing the polycondensation may be substituted for those specifically enumerated in the foregoing examples. The novel and unique concept disclosed herein is the catalyst for polycondensation reactions, all of the various polycondensation reactions and reaction conditions being beyond the scope of this invention and too voluminous to specifically enumerate. Further variations may be practiced by those skilled in the art without departing from the scope and spirit of the invention except as set forth in the claims.

What is claimed is:
1. In the preparation of polyesters or polyetheresters by polycondensing the glycol esters of carboxylic acids selected from the group consisting of terephthalic acid, p-(b-hydroxyethoxy) benzoic acid and 1,2-bis-(4-carboxyphenoxy) ethane the improvement which comprises conducting the polycondensation reaction in the presence of a catalytic amount of a mixture consisting of substantially equal parts of antimony triphenyl and germanium dioxide as a catalyst.

2. In the preparation of polyesters or polyetheresters by polycondensing the glycol esters of carboxylic acids selected from the group consisting of terephthalic acid, p-(b-hydroxyethoxy) benzoic acid and 1,2-bis-(4-carboxyphenoxy) ethane the improvement which comprises conducting the polycondensation reaction in the presence of a catalytic amount of a mixture consisting of substantially equal parts of antimony triphenyl and zinc acetyl acetonate as a catalyst.

3. In the preparation of polyesters or polyetheresters by polycondensing the glycol esters of carboxylic acids selected from the group consisting of terephthalic acid, p-(b-hydroxyethoxy) benzoic acid and 1,2-bis-(4-carboxyphenoxy) ethane the improvement which comprises conducting the polycondensation reaction in the presence of a catalytic amount of a catalyst selected from the group consisting of (1) a mixture consisting of substantially equal parts of antimony triphenyl and germanium dioxide, and (2) a mixture consisting of substantially equal parts of antimony triphenyl and zinc acetyl acetonate.

4. In the preparation of polyesters and polyethers by polycondensing the glycol esters of carboxylic acids selected from the group consisting of terephthalic acid, p-(b-hydroxyethoxy) benzoic acid and 1,2-bis-(4-carboxyphenoxy) ethane the improvement which comprises conducting the polycondensation reaction in the presence of from about 0.1 to about 0.3% by weight of a catalyst selected from the group consisting of (1) a mixture consisting of substantially equal parts of antimony triphenyl and germanium dioxide, and (2) a mixture consisting of substantially equal parts of antimony triphenyl and zinc acetyl acetonate.

5. As a new catalyst for the preparation of polyesters and polyetheresters by a polycondensation reaction, a member selected from the group consisting of (1) a mixture consisting of substantially equal parts of antimony triphenyl and germanium dioxide, and (2) a mixture consisting of substantially equal parts of antimony triphenyl and zinc acetyl acetonate.

References Cited

UNITED STATES PATENTS

| | | | |
|---|---|---|---|
| 2,578,660 | 12/1951 | Auspos et al. | 260—75 |
| 2,820,023 | 1/1958 | Cavanaugh et al. | 260—75 |
| 3,047,539 | 7/1962 | Pengilly | 260—75 |
| 3,080,420 | 3/1963 | Ringwald | 260—75 XR |

WILLIAM H. SHORT, *Primary Examiner.*

LOUISE P. QUAST, *Assistant Examiner.*